(12) United States Patent
Zhou et al.

(10) Patent No.: US 11,623,603 B2
(45) Date of Patent: Apr. 11, 2023

(54) VEHICLE FRONT AIRBAG ASSEMBLY WITH MULTIPLE CHAMBERS

(71) Applicants: Ford Global Technologies, LLC, Dearborn, MI (US); AUTOLIV ASP, INC., Ogden, UT (US)

(72) Inventors: Rongrong Zhou, Bloomfield Hills, MI (US); Robert William McCoy, Ann Arbor, MI (US); David W. Schneider, Ogden, UT (US); Dean M. Jaradi, Macomb, MI (US); Kevin Siasoco, Ann Arbor, MI (US); Frank J. Herzenstiel, Odgen, UT (US)

(73) Assignees: FORD GLOBAL TECHNOLOGIES, LLC, Dearborn, MI (US); AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 17/239,744

(22) Filed: Apr. 26, 2021

(65) Prior Publication Data
US 2022/0340098 A1    Oct. 27, 2022

(51) Int. Cl.
| B60R 21/233 | (2006.01) |
| B60R 21/232 | (2011.01) |
| B60R 21/213 | (2011.01) |
| B60R 21/231 | (2011.01) |

(52) U.S. Cl.
CPC .......... B60R 21/233 (2013.01); B60R 21/213 (2013.01); B60R 21/232 (2013.01); *B60R 2021/23169* (2013.01)

(58) Field of Classification Search
CPC .... B60R 2021/0009; B60R 2021/0023; B60R 2021/0048; B60R 2021/0051; B60R 2021/0053; B60R 2021/23169; B60R 2021/23308; B60R 2021/23324; B60R 2021/23386; B60R 2021/26094; B60R 21/213; B60R 21/214; B60R 21/232; B60R 21/233
See application file for complete search history.

(56) References Cited

U.S. PATENT DOCUMENTS

| 3,642,303 | A * | 2/1972 | Irish | B60R 21/233 |
| | | | | 280/730.1 |
| 6,283,500 | B1 * | 9/2001 | Eckert | B60R 21/232 |
| | | | | 280/743.1 |
| 6,722,691 | B1 * | 4/2004 | Håland | B60R 21/233 |
| | | | | 280/743.2 |
| 6,932,380 | B2 * | 8/2005 | Choi | B60R 21/232 |
| | | | | 280/730.1 |

(Continued)

FOREIGN PATENT DOCUMENTS

| CN | 106740645 B | 10/2018 |
| JP | 2011143805 A * | 7/2011 |
| WO | 2020242558 A1 | 12/2020 |

*Primary Examiner* — Laura Freedman
(74) *Attorney, Agent, or Firm* — Frank A. MacKenzie; Bejin Bieneman PLC

(57) ABSTRACT

An airbag includes a U-shaped chamber, a head-impact chamber, and an uninflatable panel. The U-shaped chamber has a first side leg, a second side leg, and a top extending from the first side leg to the second side leg. The head-impact chamber is disposed between the first side leg and the second side leg. The uninflatable panel extends from the first leg to the second leg adjacent the head-impact chamber.

17 Claims, 8 Drawing Sheets

(56) References Cited

U.S. PATENT DOCUMENTS

| | | | |
|---|---|---|---|
| 7,195,276 B2* | 3/2007 | Higuchi | B60R 21/231 |
| | | | 280/743.1 |
| 7,331,597 B2* | 2/2008 | Williams | B60R 21/261 |
| | | | 280/743.1 |
| 7,513,524 B2* | 4/2009 | Oota | B60R 21/18 |
| | | | 280/733 |
| 7,828,322 B2* | 11/2010 | Breuninger | B60R 21/36 |
| | | | 280/730.2 |
| 7,926,840 B1* | 4/2011 | Choi | B60R 21/214 |
| | | | 280/730.1 |
| 8,215,665 B2* | 7/2012 | Ohara | B60R 21/2346 |
| | | | 280/740 |
| 8,328,228 B2* | 12/2012 | Lee | B60R 21/214 |
| | | | 280/743.1 |
| 8,376,396 B2* | 2/2013 | Miller | B60R 21/206 |
| | | | 280/736 |
| 8,393,637 B2* | 3/2013 | Choi | B60R 21/231 |
| | | | 280/743.2 |
| 8,414,017 B2 | 4/2013 | Lee et al. | |
| 8,579,321 B2 | 11/2013 | Lee et al. | |
| 9,296,358 B2* | 3/2016 | Chen | B60R 21/205 |
| 9,308,883 B1* | 4/2016 | Schneider | B60R 21/231 |
| 9,446,733 B2* | 9/2016 | Pausch | B60R 21/2334 |
| 9,533,651 B1* | 1/2017 | Ohno | B60N 2/914 |
| 9,676,361 B2 | 6/2017 | Smith et al. | |
| 9,956,937 B2* | 5/2018 | Jindal | B60R 21/231 |
| 10,246,043 B2* | 4/2019 | Schneider | B60R 21/235 |
| 10,266,145 B2 | 4/2019 | Paxton et al. | |
| 10,272,868 B2 | 4/2019 | Jaradi et al. | |
| 10,279,770 B2 | 5/2019 | Faruque et al. | |
| 10,464,518 B2* | 11/2019 | Patel | B60R 21/231 |
| 10,471,923 B2* | 11/2019 | Jimenez | B60R 21/213 |
| 10,486,639 B2* | 11/2019 | Nagasawa | B60R 21/2338 |
| 10,583,799 B2* | 3/2020 | Schneider | B60R 21/214 |
| 10,703,320 B2 | 7/2020 | Farooq et al. | |
| 10,836,337 B2* | 11/2020 | Shin | B60R 21/214 |
| 10,857,966 B2* | 12/2020 | Deng | B60R 21/205 |
| 10,953,837 B2* | 3/2021 | Arima | B60R 21/233 |
| 11,046,282 B2* | 6/2021 | Lee | B60R 21/2338 |
| 11,117,540 B2* | 9/2021 | Hwangbo | B60R 21/261 |
| 11,230,253 B2* | 1/2022 | Hellot | B60R 21/214 |
| 11,279,311 B2* | 3/2022 | Schroeder | B60R 21/26 |
| 2012/0133114 A1 | 5/2012 | Chui et al. | |
| 2019/0054888 A1* | 2/2019 | Fukawatase | B60R 21/206 |
| 2019/0241148 A1 | 8/2019 | Shin et al. | |
| 2021/0031718 A1* | 2/2021 | Schultz | B60R 21/231 |
| 2022/0111815 A1* | 4/2022 | Schneider | B60R 21/233 |
| 2022/0250573 A1* | 8/2022 | Jayakar | B60R 21/232 |

* cited by examiner

VEHICLE FRONT AIRBAG ASSEMBLY WITH MULTIPLE CHAMBERS

BACKGROUND

Automobiles are subject to a variety of crash tests, including standard tests regulated by the National Highway Traffic Safety Administration (NHTSA). For example, these tests may be directed toward oblique impacts, i.e., impacts that occur at an angle of 10-50 degrees relative to a vehicle's trajectory. During the oblique impact, occupants of the vehicle move forward and laterally. As one example of an oblique impact test, a moving cart with a deformable barrier moves at 56 mph and impacts a stationary vehicle at a 15 degree angle with a 35% overlap. As another example, the vehicle can be subject to a frontal angular crash test that satisfies the criteria for the Federal Motor Vehicle Safety Standards (FMVSS) 208 § 5.1 evaluation.

Several types of information are measured during the crash test, including airbag performance, test dummy reaction, etc. One type of measurement is the Head Injury Criteria (HIC) during the oblique impact.

DETAILED DESCRIPTION

Figure 1:
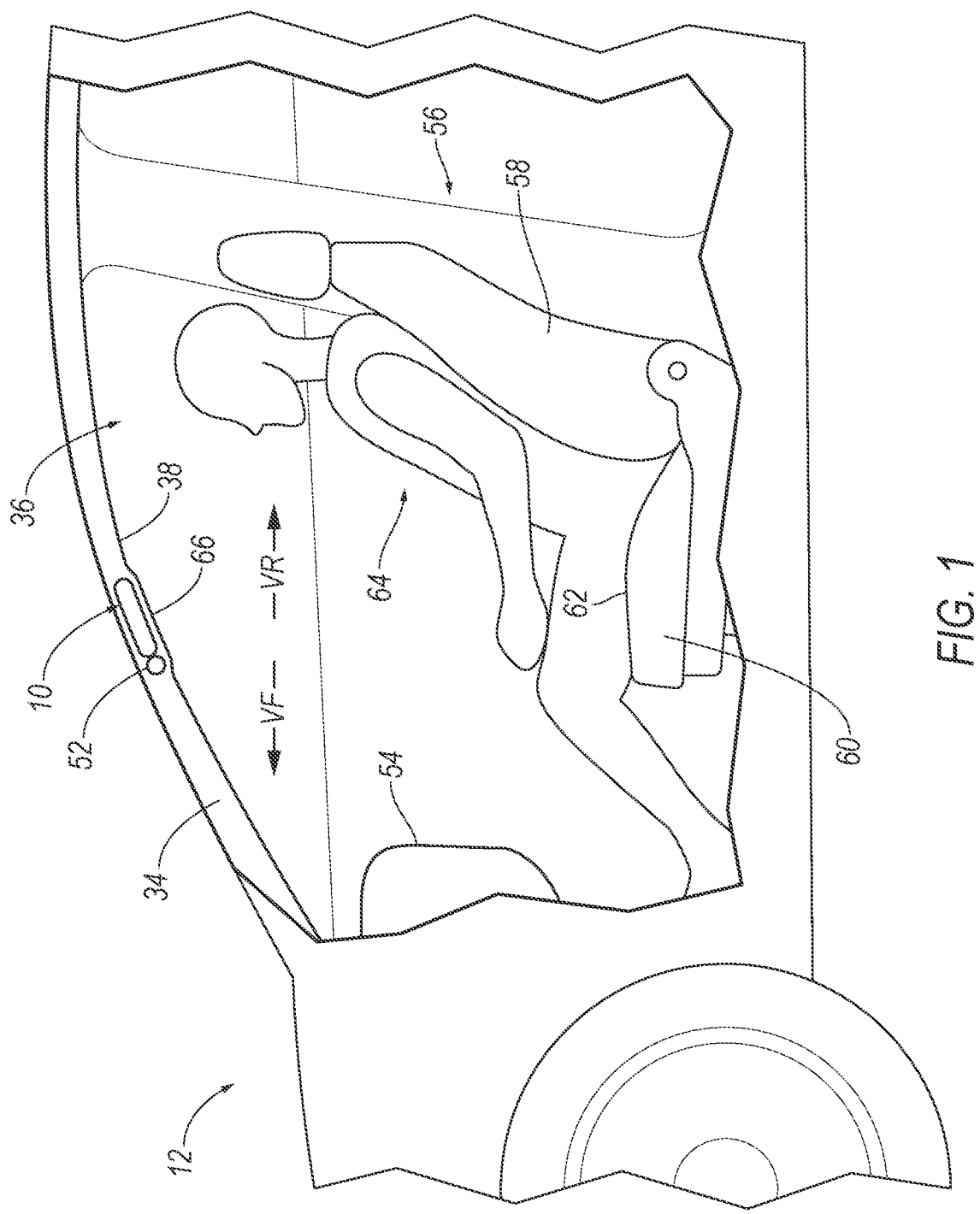
FIG. 1 is a side cross-sectional view of an interior of a vehicle.

An airbag assembly includes an upper chamber, a torso chamber, and a knee chamber in fluid communication with each other and each inflatable to an inflated position. The torso chamber is supported by and extending below the upper chamber in the inflated position. The knee chamber is supported by and extending below the torso chamber in the inflated position. The airbag assembly includes a one-way valve fluidly having a fluid path from the torso chamber to the knee chamber.

The upper chamber may be U-shaped having a first side leg, a second side leg, and a top extending from the first side leg to the second side leg. The first side leg and the second side leg may fluidly connect the top of the upper chamber and the torso chamber.

The airbag assembly may further include an inflator in fluid communication with the upper chamber, the first side leg and the second side leg defining a fluid path from the top to the torso chamber.

The airbag assembly may further include a head-impact chamber in fluid communication with and extending upwardly from the torso chamber between the first side leg and the second side leg in the inflated position.

The airbag assembly may further include a space between the head-impact chamber and the first side leg, the second side leg, and the top in the inflated position.

The airbag assembly may further include an uninflatable panel extending from the first side leg to the second side leg adjacent the head-impact chamber.

The head-impact chamber in the inflated position may be movable toward the uninflatable panel in a vehicle-forward direction.

The airbag assembly may further include an external tether extending from the torso chamber to the knee chamber.

The knee chamber may be vehicle-forward of the torso chamber in the inflated position.

The airbag may further include a support chamber inflatable to an inflated position, the support chamber may extend from the torso chamber, and the knee chamber may extend from the support chamber.

The fluid path of the one-way valve may extend through the support chamber to the knee chamber.

An airbag includes a U-shaped chamber having a first side leg, a second side leg, and a top extending from the first side leg to the second side leg, a head-impact chamber between the first side leg and the second side leg, and an uninflatable panel extending from the first leg to the second leg adjacent the head-impact chamber.

The airbag may further include a space between the head-impact chamber and the first side leg, the second side leg, and the top in an inflated position.

The head-impact chamber may be inflatable into the space between the first side leg and the second side leg.

The head-impact chamber may be movable toward the uninflatable panel in a vehicle-forward direction.

A vehicle includes a roof rail and an airbag supported by the roof rail and inflatable to an inflated position. The airbag includes an upper chamber, a torso chamber, and a knee chamber in fluid communication with each other and each inflatable to an inflated position. The torso chamber is supported by and extending below the upper chamber in the inflated position. The knee chamber is supported by and extending below the torso chamber in the inflated position. The airbag includes a one-way valve fluidly having a fluid path from the torso chamber to the knee chamber.

The vehicle may further include an instrument panel disposed in a vehicle-forward direction relative to airbag.

The airbag may further include a support chamber inflatable to an inflated position, the support chamber may extend below the torso chamber and may extend above the knee chamber, and the support chamber may be inflatable toward the instrument panel.

The vehicle may further include a vehicle seat, wherein the airbag in the inflated position may be disposed between the instrument panel and the vehicle seat.

The vehicle seat may have a bottom, the bottom may have an upper surface, and the knee chamber may extend below the upper surface of the bottom.

With reference to the Figures, wherein like numerals indicate like parts throughout the several views, an airbag assembly 10 in a vehicle 12 includes an airbag 14, the airbag 14 including an upper chamber 16, a torso chamber 18, and a knee chamber 20 in fluid communication with each other and each inflatable to an inflated position. The torso chamber 18 is supported by and extends below the upper chamber 16 in the inflated position. The knee chamber 20 is supported by and extends below the torso chamber 18 in the inflated position. The airbag assembly 10 further includes a one-way valve 22 fluidly having a fluid path from the torso chamber 18 to the knee chamber 20.

The one-way valve 22 allows inflation medium to inflate the knee chamber 20 while preventing inflation medium from moving back from the knee chamber 20 into the torso chamber 18. The one-way valve 22 thus maintains the inflation pressure of the knee chamber 20 while the upper chamber 16 and the torso chamber 18 inflate, allowing the knee chamber 20 to absorb energy from the occupant's legs during the impact. Thus, the knee chamber 20 may absorb energy from the occupant's legs, which may reach the airbag 14 before other parts of the occupant, and the energy from the occupant's legs may not reduce the inflation pressure of the knee chamber 20 because the one-way valve 22 may prevent movement of the inflation medium out from the knee chamber 20.

The upper chamber 16 may be a U-shaped chamber having a first side leg 24, a second side leg 26, and a top 28 extending from the first side leg 24 to the second side leg 26. In such an example, the airbag assembly 10 includes a head-impact chamber 30 between the first side leg 24 and the second side leg 26. The airbag assembly 10 includes an uninflatable panel 32 extending from the first side leg 24 to the second side leg 26 adjacent the head-impact chamber 30.

The airbag assembly 10 absorbs energy from an occupant of the vehicle 12 during frontal oblique impacts. During a vehicle impact that urges an occupant in an oblique direction, e.g., an oblique impact, the U-shaped upper chamber 16 directs the occupant away from the oblique direction and/or absorbs energy from the occupant moving forward during the impact. Specifically, the side legs 24, 26 absorb energy from the occupant and direct the occupant toward the head-impact chamber 30. The head-impact chamber 30 absorbs energy from the occupant's head and deflects forward toward the uninflatable panel 32, reducing forward motion of the occupant. The uninflatable panel 32 absorbs energy from the head-impact chamber 30, absorbing additional energy from the occupant's head. The deflection of the head of the occupant by the head-impact chamber 30 and/or the absorption of energy by the U-shaped upper chamber 16 during impact by the head of the occupant reduces movement of the occupant's head, which may reduce HIC values.

Figure 3:
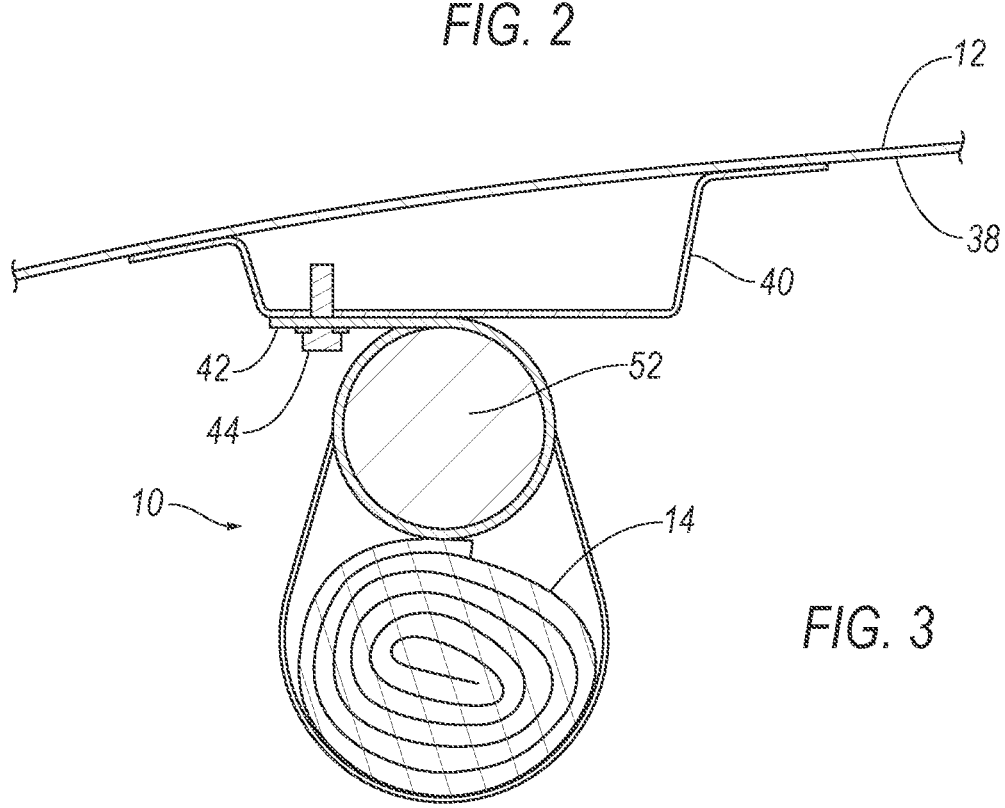
FIG. 3 is a cross-sectional view of an airbag assembly.
Figure 4:
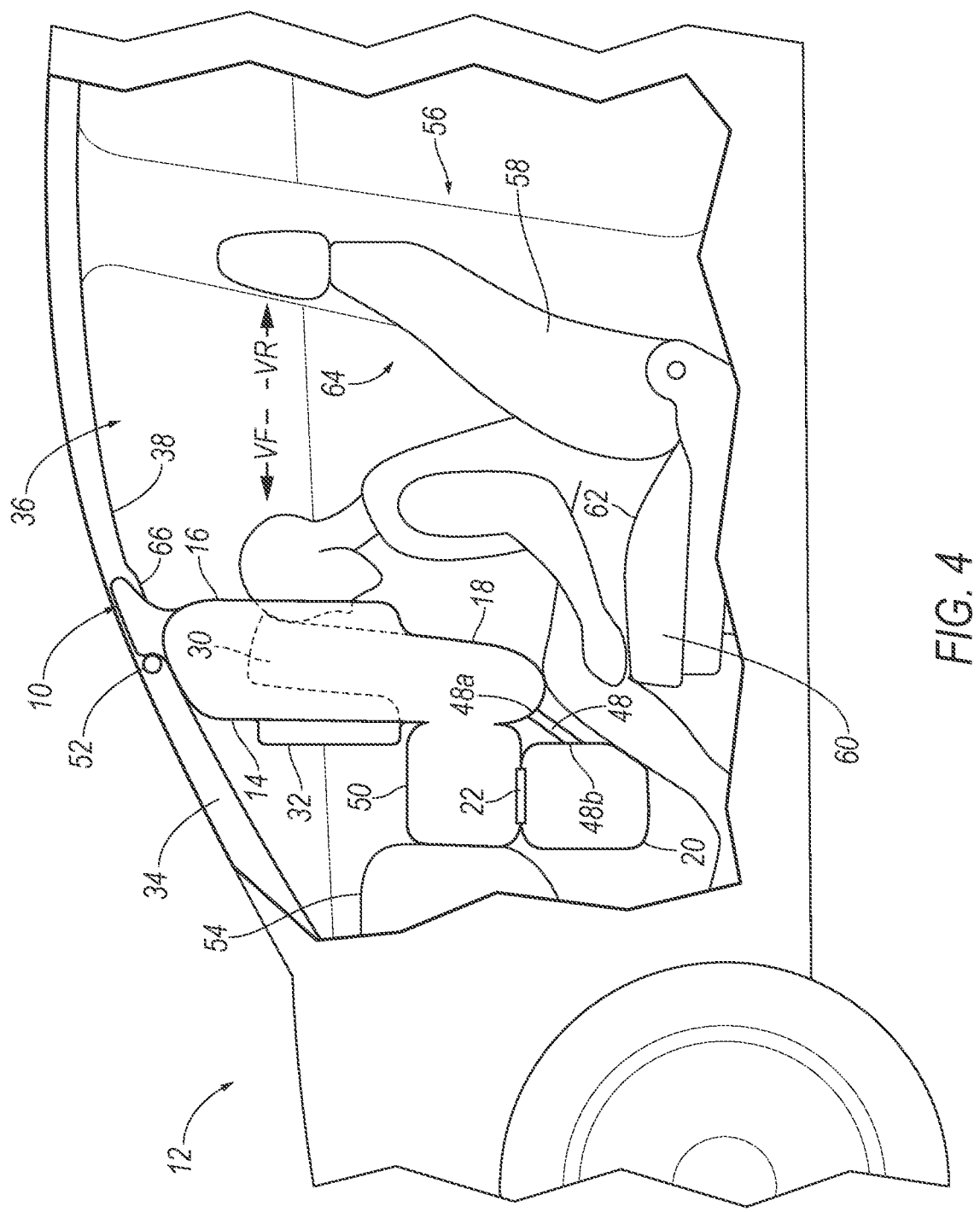
FIG. 4 is a side cross-sectional view of the interior of the vehicle with an airbag of the airbag assembly in an inflated position.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from the driver, i.e., the vehicle 12 may be self-driving without human input. The vehicle 12 defines a vehicle-forward direction VF and a vehicle-rearward direction VR, as shown in FIGS. 1 and 4. The vehicle-forward direction VF is a direction along a forward direction of travel of the vehicle 12, i.e., forward along a longitudinal axis of the vehicle 12. The vehicle-rearward direction is a direction opposing the forward direction of travel of the vehicle 12, i.e., rearward along the longitudinal axis of the vehicle 12. The vehicle 12 defines a cross-vehicle direction CV, as shown in FIG. 3. The cross-vehicle direction CV is perpendicular to the vehicle-forward direction VF, i.e., along a lateral axis of the vehicle 12.

The vehicle 12 includes a body 34. The body 34 may be of a unibody construction. In the unibody construction, the body is unitary, i.e., a continuous one-piece unit, and includes a subframe. As another example not shown in the Figures, the body 34 and a frame may have a body-on-frame construction (also referred to as a cab-on-frame construction). In other words, the body 34 and the frame are separate components, i.e., are modular, and the body 34 is supported on and affixed to the frame. Alternatively, the body 34 and the frame may have any suitable construction. The body 34 and/or the frame may be formed of any suitable material, for example, steel, aluminum, etc.

Figure 5:
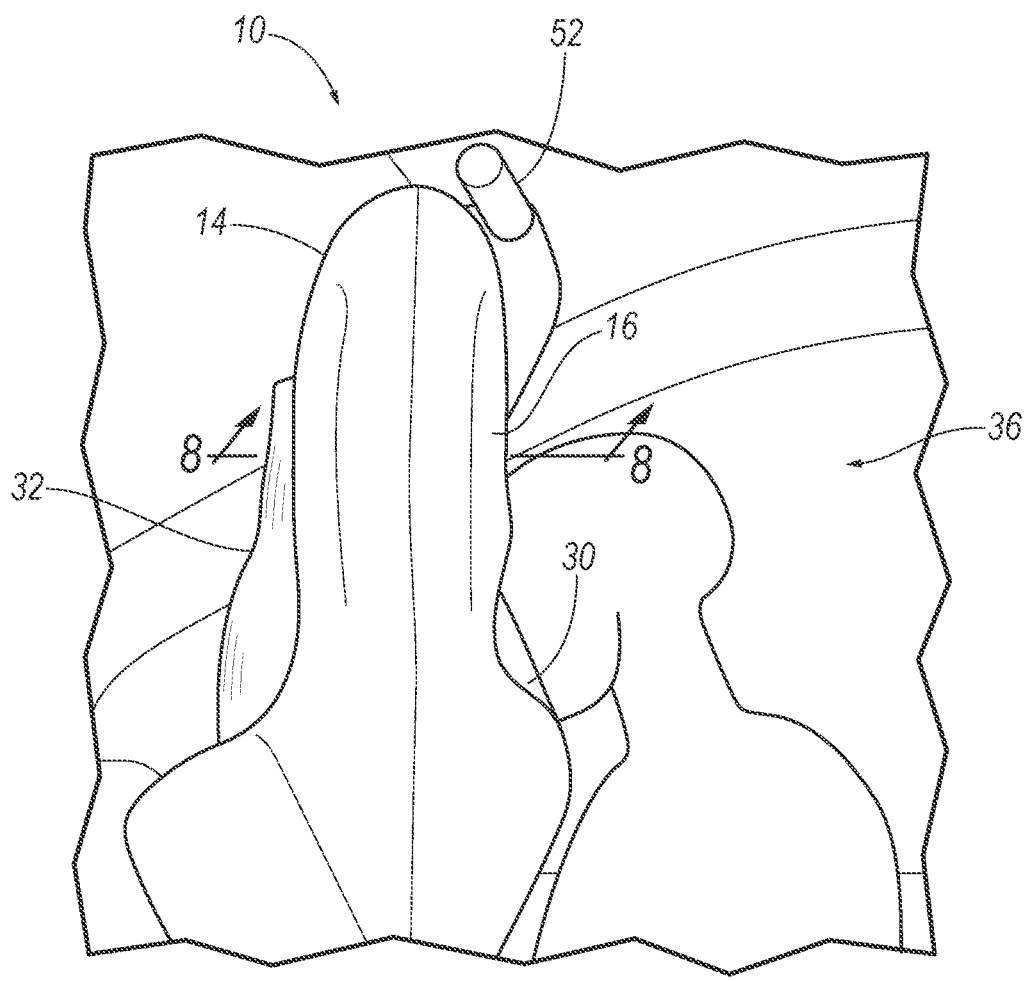
FIG. 5 is a side view of the airbag in the inflated position.

The vehicle 12 includes a passenger cabin 36 to house occupants, if any, of the vehicle. The passenger cabin 36 is an interior portion of the vehicle 12 enclosed by the body 34 in which occupants sit during operation of the vehicle 12. As shown in FIGS. 4-5, the airbag assembly 10 inflates into the passenger cabin 36 in the inflated position.

The body 34 of the vehicle 12 includes a roof 38 and a roof rail 40, as shown in FIGS. 1-4. The roof 38 extends above occupants in the passenger cabin 36. The roof rail 40 extends along the roof 38 in a cross-vehicle direction, i.e., along a lateral axis of the body 34. The airbag assembly 10 may be supported by the roof rail 40. For example, the vehicle 12 may include a mount 42 on which the airbag assembly 10 is supported and a fastener 44 to connect the mount 42 to the roof rail 40. The fastener may be of a suitable type, e.g., a bolt, a pin, a screw, etc. Alternatively, the airbag assembly 10 may be supported by the roof rail 40 in a suitable manner. When the airbag assembly 10 is supported by the roof rail 40, the airbag assembly 10 may inflate vertically downward toward the occupant in the vehicle 12. That is, disposing the airbag assembly 10 in the roof 38 along the roof rail 40 allows the airbag assembly 10 to absorb energy from more than one part of the body of the occupant as the airbag 14 inflates vertically downward. When the airbag assembly 10 is in the uninflated position, the airbag assembly 10 may be concealed from occupants in the vehicle 12 by a headliner 66. The headliner 66 is a class-A surface that conceals the roof rail 40 and the airbag assembly 10 from view when the airbag assembly 10 is in the uninflated position.

Figure 2:
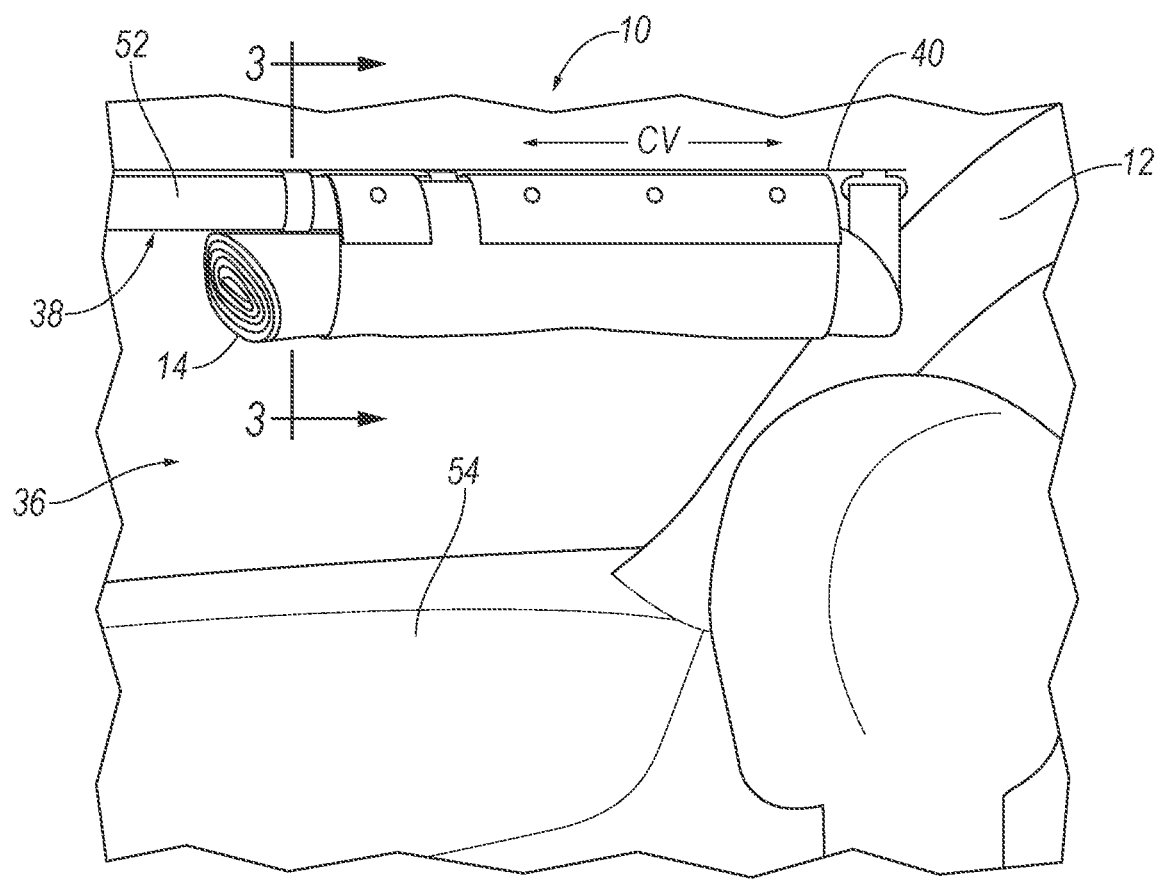
FIG. 2 is a perspective view of the interior of the vehicle.

The vehicle 12 includes the airbag assembly 10, as shown in FIGS. 1-10. The airbag assembly 10 includes the airbag 14. The airbag 14 is inflatable from an uninflated position, shown in FIGS. 1-3, to the inflated position, shown in FIGS. 4-7. In the uninflated position, the airbag 14 may be stowed along the roof rail 40, e.g., rolled and supported below the roof rail 40 as shown in FIGS. 2-3. Alternatively, the airbag 14 may be stowed along the roof rail 40 in a suitable manner. The airbag 14 may be formed of any suitable airbag material, for example, a woven polymer. For example, the airbag 14 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The airbag 14 includes the upper chamber 16. In the inflated position, the upper chamber 16 is above the torso chamber 18 and the knee chamber 20. The upper chamber 16 may be supported by the roof rail 40. That is, the upper chamber 16 may inflate from the roof rail 40 into the passenger cabin 36 of the vehicle 12. The upper chamber 16 is U-shaped, i.e., shaped like the Roman letter "U". The upper chamber 16 includes the first side leg 24, the second side leg 26, and the top 28, the top 28 extending from the first side leg 24 to the second side leg 26 in a U-shape. The first side leg 24, the second side leg 26, and the top 28 are fluidly connected, i.e., inflation medium moves from the top 28 to the side legs 24, 26 during inflation of the airbag 14.

The first side leg 24 and the second side leg 26 may be fluidly connected to the torso chamber 18, i.e., inflation medium may move through the side legs 24, 26 into the torso chamber 18. The side legs 24, 26 may fluidly connect the top 28 of the upper chamber 16 to the torso chamber 18, i.e., inflation medium may move from the top 28 of the upper chamber 16 through the side legs 24, 26 and into the torso chamber 18, inflating the torso chamber 18. The upper chamber 16 absorbs energy from a head of the occupant during the vehicle impact, and the side legs 24, 26 may direct the head of the occupant forward during an oblique impact, reducing movement of the head of the occupant.

The side legs 24, 26 of the upper chamber 16 define a space 46 therebetween, as shown in FIGS. 6, 8-10. The space 46 is a void defined between the first side leg 24, the second side leg 26, and the top 28 of the upper chamber 16. The occupant may move into the space 46 during the vehicle impact. The space 46 allows the side legs 24, 26 and the top 28 to direct the head of the occupant forward, reducing lateral movement of the occupant during the oblique impact.

Figure 9:
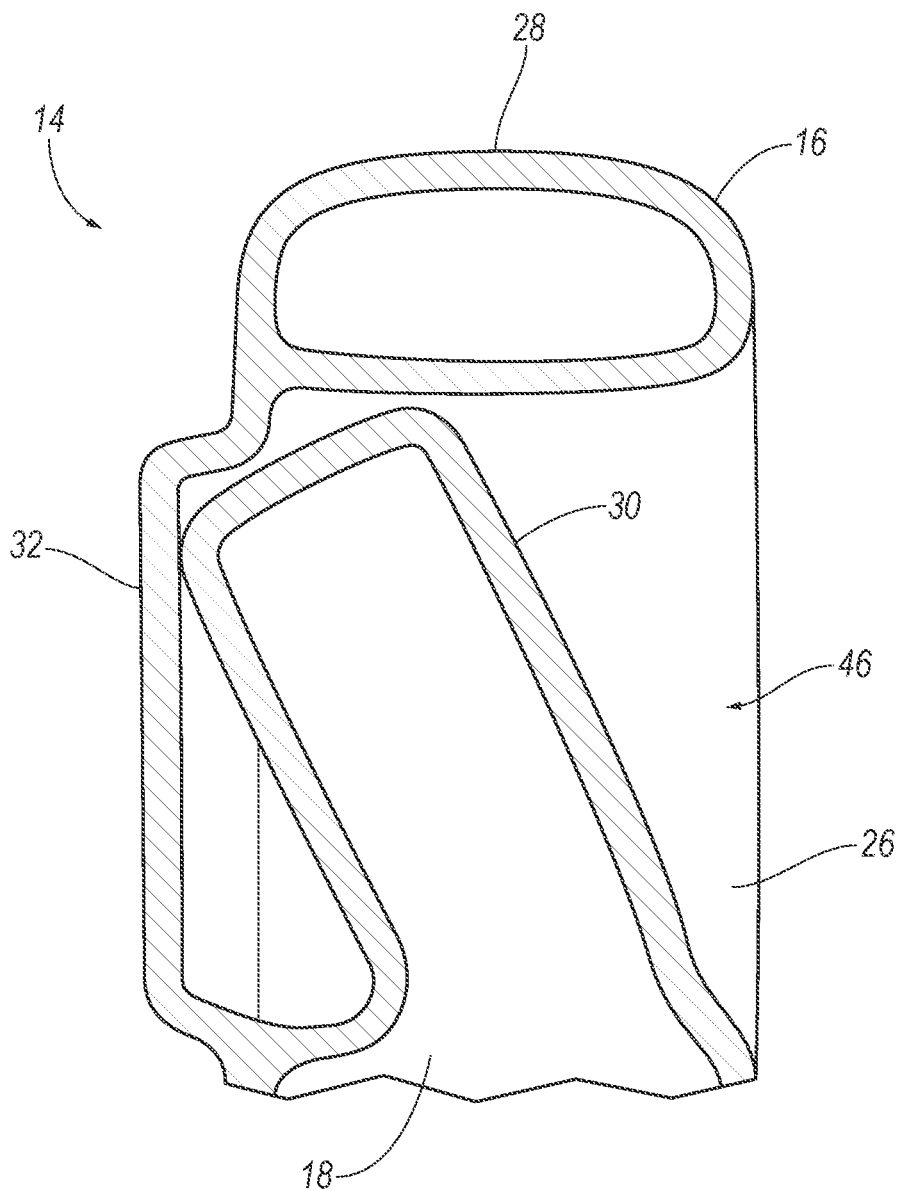
FIG. 9 is a cross-sectional view of a head impact chamber moving toward an uninflatable panel.
Figure 10:
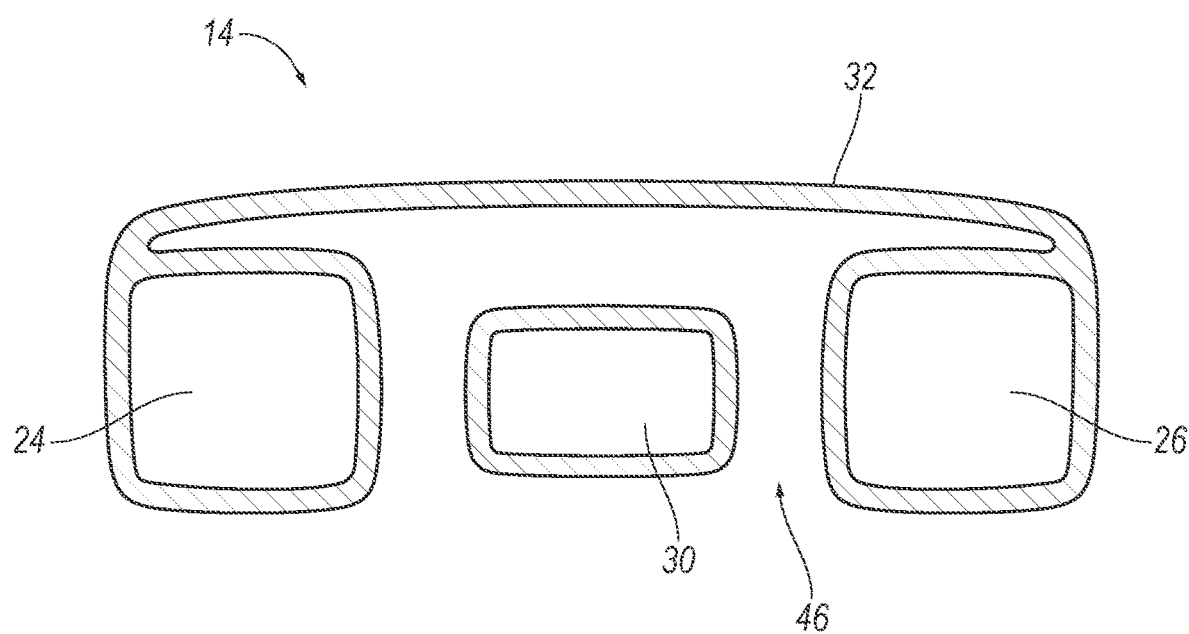
FIG. 10 is a planar cross-sectional view of the upper chamber of the airbag.

The airbag 14 includes the head-impact chamber 30, as shown in FIGS. 4-6, 8-10. The head-impact chamber 30 is disposed between the first side leg 24 and the second side leg 26. The head-impact chamber 30 is inflatable to an inflated position between the first side leg 24 and the second side leg 26, as shown in FIG. 10. The head-impact chamber 30 may be in fluid communication with the torso chamber 18, extending upwardly from the torso chamber 18 into the space 46 between the first side leg 24 and the second side leg 26 in the inflated position. The head-impact chamber 30 may absorb energy from the occupant during the vehicle impact. When the head-impact chamber 30 inflates into the space 46, the head-impact chamber 30, the first side leg 24, and the second side leg 26 may absorb energy from the occupant moving toward the airbag 14 during the oblique impact. The head-impact chamber 30 may absorb energy of the head of the occupant while the side legs 24, 26 and the top 28 direct the head of the occupant forward, reducing lateral movement of the occupant during the oblique impact.

The airbag 14 includes the uninflatable panel 32 extending from the first side leg 24 to the second side leg 26, as shown in FIGS. 4-5, 7-10. The uninflatable panel 32 may be disposed adjacent the head-impact chamber 30, as shown in FIGS. 5, 8-10. The uninflatable panel 32 may be, e.g., a sheet extending from the first side leg 24 to the second side leg 26. The uninflatable panel 32 may be a woven fabric of a polymer, e.g., a same type of material as the rest of the airbag 14 such as nylon 6-6, polyether ether ketone (PEEK), polyetherketoneketone (PEKK), polyester, etc. Alternatively, the uninflatable panel 32 may be a suitable material. When the head-impact chamber 30 is in the inflated position, the uninflatable panel 32 is vehicle-forward of the head-impact chamber 30, as shown in FIGS. 5, 8-10. The head-impact chamber 30 may move toward the uninflatable panel 32 in the vehicle-forward direction, as shown in FIGS. 5 and 9, when impacted by an occupant during a vehicle-frontal impact. The uninflatable panel 32 may absorb energy from the head-impact chamber 30, reducing forward movement of the occupant during the vehicle impact. That is, the side legs 24, 26 and the top 28 may direct the occupant forward into the space 46, the head-impact chamber 30 may begin to gradually absorb energy and reduce lateral movement of the occupant, and the uninflatable panel 32 may absorb energy from the head-impact chamber 30, reducing forward movement of the occupant during the vehicle impact.

Figure 7:
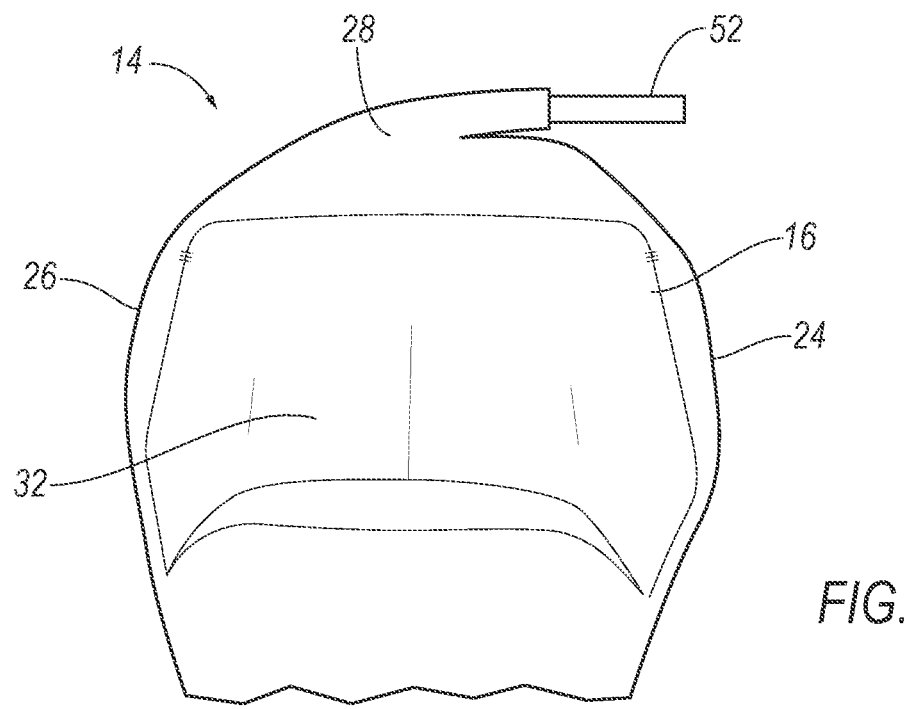
FIG. 7 is a rear view of the upper chamber of the airbag.
Figure 8:
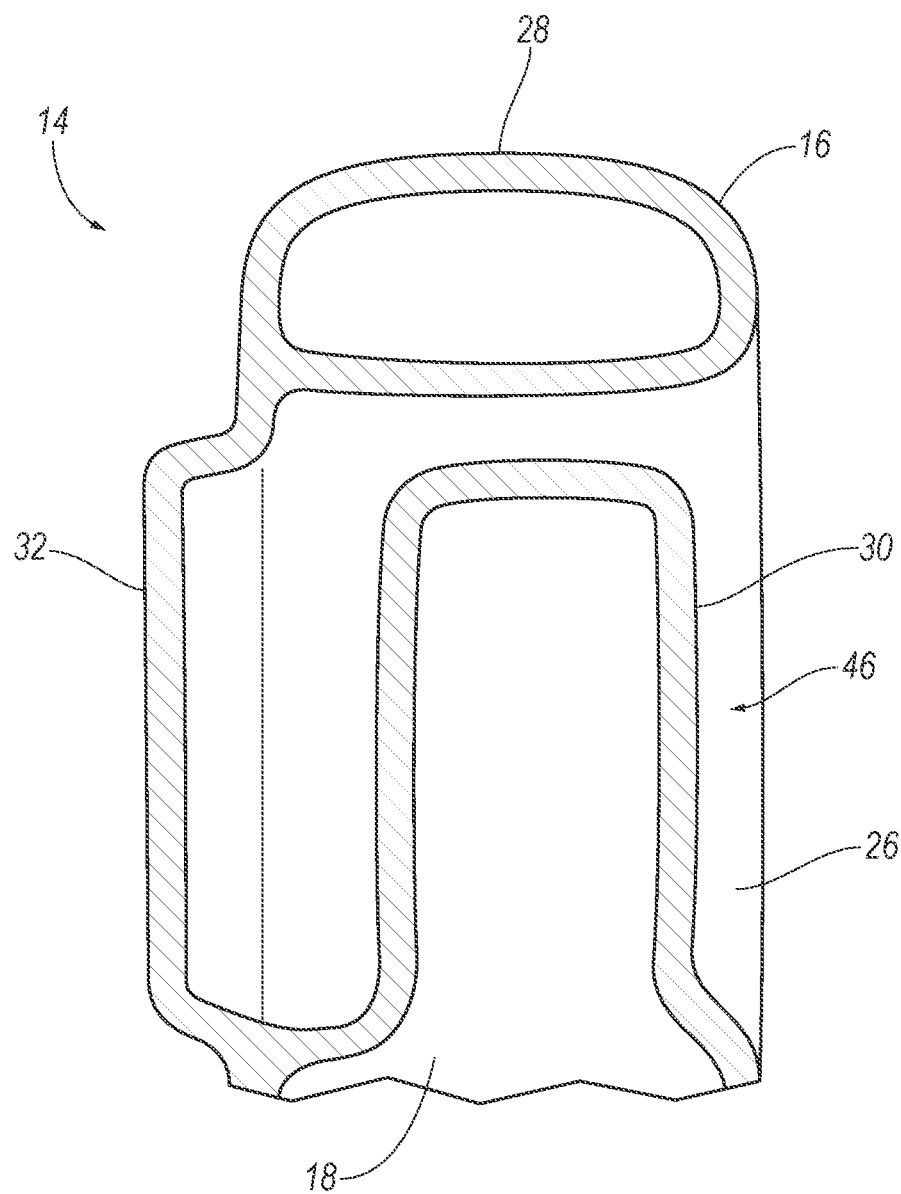
FIG. 8 is a cross-sectional view of the upper chamber of the airbag.

The uninflatable panel 32 may be attached to the first side leg 24 and the second side leg 26 by stitching, as shown in FIG. 7. Alternatively, the uninflatable panel 32 may be attached to the first side leg 24 and the second side leg 26 with a suitable attachment, e.g., an adhesive, a fastener, etc. The uninflatable panel 32 may be attached to the side legs 24, 26 and unattached from the top 28. That is, the cross-vehicle edges of the uninflatable panel 32 may be attached to the side legs 24, 26, and the topmost edge of the uninflatable panel 32 may be unattached, freely moving when the head-impact chamber 30 engages the uninflatable panel 32. Alternatively, all of the edges of the uninflatable panel 32 may be attached to the side legs 24, 26 and the top 28 by a suitable attachment, e.g., stitching, an adhesive, a fastener, etc.

Figure 6:
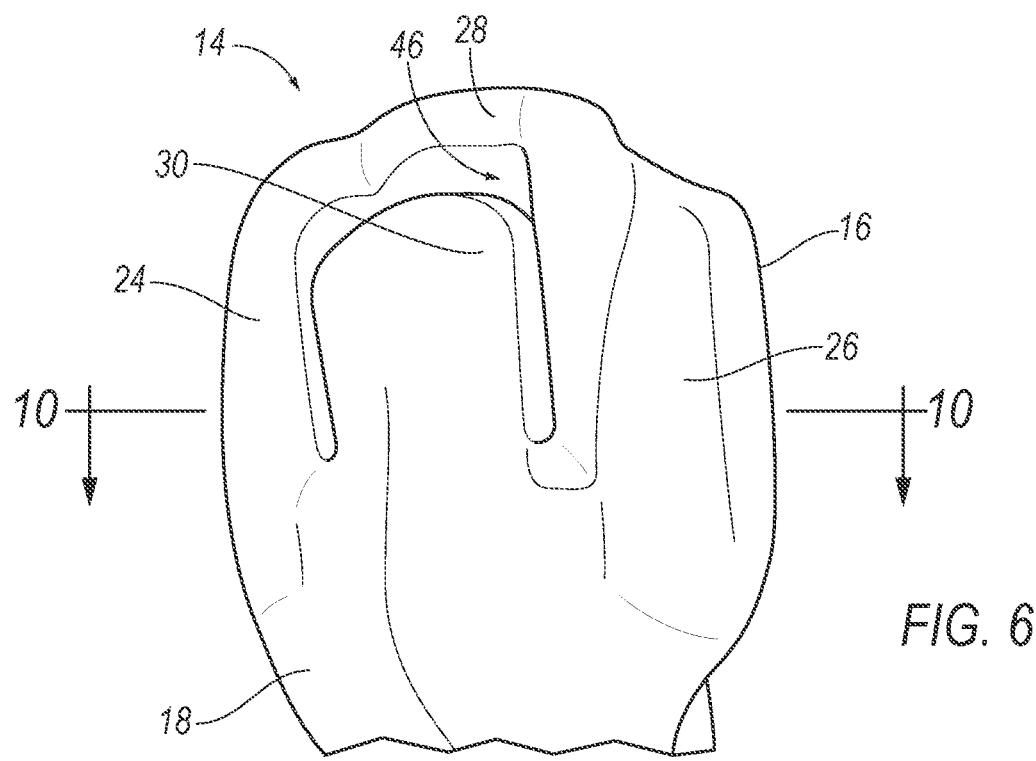
FIG. 6 is a perspective view of an upper chamber of the airbag.

The airbag includes the torso chamber 18, as shown in FIGS. 4, 6, 8-9. The torso chamber 18 extends from the upper chamber 16 toward the knee chamber 20. As described above, inflation medium moves from the upper chamber 16 to the torso chamber 18, inflating the torso chamber 18. The head-impact chamber 30 extends from the torso chamber 18 into the space 46 between the first side leg 24 and the second side leg 26, as shown in FIGS. 4, 6. The torso chamber 18 absorbs energy from a central portion of the occupant's body during the vehicle impact, e.g., a torso of the occupant.

The airbag 14 includes the knee chamber 20. The knee chamber 20 is disposed below the torso chamber 18 when the airbag is in the inflated position. Inflation medium may flow from the torso chamber 18 into the knee chamber 20 to inflate the knee chamber 20. The knee chamber 20 may absorb energy from a lower portion of the occupant during the vehicle impact, e.g., the occupant's knees and legs. The knee chamber 20 may be vehicle-forward of the torso chamber 18 in the inflated position. That is, because the occupant's knees extend vehicle-forward of the occupant's torso when seated, the knee chamber 20 may be arranged to inflate vehicle-forward of the torso chamber 18. Thus, the upper chamber 16 may absorb energy from an upper portion of the occupant's body, the torso chamber 18 may absorb energy from a central portion of the occupant's body, and the knee chamber 20 may absorb energy from a lower portion of the occupant's body during the vehicle impact.

The airbag 14 includes the one-way valve 22, as shown in FIG. 4. The one-way valve 22 allows inflation medium to move in one direction and prevents the inflation medium from moving in the opposing direction. The one-way valve 22 is disposed between the torso chamber 18 and the knee chamber 20. For example, the one-way valve 22 may be disposed at the knee chamber 20, and the one-way valve provides inflation medium to the knee chamber 20 while preventing the inflation medium from leaving the knee chamber 20, increasing and maintaining pressure in the knee chamber 20 while the airbag 14 inflates to the inflated position. That is, the knee chamber 20 reaches the inflated position before the torso chamber 18 or the upper chamber 16. Because the legs and knees of the occupant may reach the airbag 14 before the torso and the head of the occupant, inflating the knee chamber 20 to the inflated position before the torso chamber 18 or the upper chamber 16 allows the airbag 14 to absorb energy from the first parts of the occupant to reach the airbag 14. The upper chamber 16 and the torso chamber 18 may be substantially the same pressure because the chamber 16, 18 are fluidly connected. That is, the inflation medium can inflate throughout the fluidly connected upper chamber 16 and the torso chamber 18 such that the respective pressures of the chambers 16, 18 are substantially the same. The knee chamber 20 may have a greater pressure than the upper chamber 16 or the torso chamber 18 because the one-way valve 22 may prevent inflation medium from leaving the knee chamber 20.

The airbag 14 may include a tether 48. The tether 48 may have a first end 48a attached to an outer surface of the torso chamber 18 and a second end 48b attached to an outer surface of the knee chamber 20. The tether 48 is thus an external tether 48, connecting the torso chamber 18 to the knee chamber 20 when the airbag 14 is in the inflated position. The external tether 48 may position the knee chamber 20 relative to the torso chamber 18 to absorb energy from the occupant. For example, when the knee chamber 20 absorbs energy from the occupant's knees, the external tether 48 may stretch and absorb energy from the knee chamber 20, reducing movement of the knee chamber 20 in the vehicle-forward direction during the impact. The tether 48 may be, e.g., an elastic polymer that may lengthen upon stretching, allowing the knee chamber 20 to move in the vehicle-forward direction relative to the torso chamber 18 during the vehicle impact.

The airbag 14 may include a support chamber 50. The support chamber 50 may be inflatable from an uninflated position to an inflated position. The support chamber 50 may extend between the torso chamber 18 and the knee chamber 20. The support chamber 50 may position the knee chamber vehicle-forward of the torso chamber 18 when the airbag 14 is in the inflated position. That is, the support chamber 50 may extend vehicle-forward from the torso chamber 18, and the knee chamber 20 may extend vertically downward from the support chamber 50, such that when the airbag 14 is in the inflated position, the knee chamber 20 is disposed vehicle-forward relative to the torso chamber 18. The support chamber 50 thus may position the knee chamber 20 to absorb energy from the lower portion of the occupant's body that may extend vehicle-forward of the central portion of the occupant's body, arranging the knee chamber 20 and the torso chamber 18 to absorb energy from the occupant. The support chamber 50 may have an inflation pressure that is substantially the same as the upper chamber 16 and the torso chamber 18. That is, because the support chamber 50, the upper chamber 16, and the torso chamber 18 are fluidly connected, the inflation medium may move throughout the support chamber 50 the upper chamber 16, and the torso chamber 18, and the respective pressures of the chambers 16, 18, 50 may thus be substantially the same.

The airbag assembly 10 includes an inflator 52 connected to the airbag 14, as shown in FIGS. 1-5, 7. Upon receiving a signal from, e.g., a vehicle controller, the inflator 52 may inflate the airbag 14 with an inflatable medium, such as a gas. The inflator 52 may be, for example, a pyrotechnic inflator that uses a chemical reaction to drive inflation medium to the airbag. The inflator 52 may be of any suitable type, for example, a cold-gas inflator. The inflator 52 provides the inflation medium to the upper chamber of the airbag 14, inflating the airbag 14 into the passenger cabin 36 of the vehicle 12. As described above, the inflation medium from the inflator 52 moves through the one-way valve 22 into the knee chamber 20 and is prevented from moving from the knee chamber 20 into the support chamber 50.

The vehicle 12 may include an instrument panel 54, as shown in FIGS. 1-2, 4. The instrument panel 54 may be disposed at a front end of the passenger cabin 36 as shown in FIGS. 1-2, 4. The instrument panel 54 may extend across the passenger cabin 36 in the cross-vehicle direction. The instrument panel 54 may be disposed in the vehicle-forward direction relative to the airbag 14. The support chamber 50 may engage the instrument panel 54, reducing movement of the airbag 14 in the vehicle-forward direction in the inflated position. The support chamber 50 may, when engaging the instrument panel 54, direct the knee chamber 20 vertically downward, and the knee chamber 20 may absorb energy from the occupant's legs. The instrument panel 54 thus may provide a surface that the support chamber 50 may engage to position the knee chamber 20 when the airbag 14 is in the inflated position.

The vehicle 12 includes a seat 56, as shown in FIGS. 1, 4. The seat 56 includes a seat back 58 and a seat bottom 60. The seat back 58 may be supported by the seat bottom 60 and may be stationary or movable relative to the seat bottom 60. The seat back 58 and/or the seat bottom 60 may be adjustable in multiple degrees of freedom. Specifically, the seat back 58 and/or the seat bottom 60 may themselves be adjustable, in other words, with adjustable components within the seat back 58 and/or the seat bottom 60, and/or may be adjustable relative to each other. The seat 56 may be a bucket seat, but alternatively the seat 56 may be a bench seat or another type of seat.

The seat bottom 60 has an upper surface 62, as shown in FIGS. 1, 4. The occupant may sit on the upper surface 62 when in the seat 56. The torso chamber 18 in the inflated position may be disposed above the upper surface 62. For example, as shown in FIG. 4, the torso chamber 18 may be disposed entirely above the upper surface 62. The knee chamber 20 in the inflated position may extend below the upper surface 62. The occupant's legs may extend below the upper surface 62 of the seat bottom 60 toward or onto the floor, and the knee chamber 20 may extend below the upper surface 62 of the seat bottom 60 to absorb energy from the occupant's legs.

The seat back 58 may define an occupant seating area 64 of the seat 56, as shown in FIGS. 1, 4. The occupant may sit in the occupant seating area 64. The airbag 14 may be disposed between the instrument panel 54 and the occupant seating area 64 in the inflated position, vehicle-forward relative to the seat 56, as shown in FIG. 4. In the inflated position, the airbag 14 may absorb energy from the occupant moving in the vehicle-forward direction toward the instrument panel 54. Thus, the airbag 14 may be positioned such that an occupant in the occupant seating area 64 may engage the airbag 14 during the oblique impact, and the airbag 14 may absorb energy from the occupant moving forward from the occupant seating area 64.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An airbag assembly, comprising:
an upper chamber, a torso chamber, and a knee chamber in fluid communication with each other and each inflatable to an inflated position;
the torso chamber being supported by and extending below the upper chamber in the inflated position;
the knee chamber being supported by and extending below the torso chamber in the inflated position; and
a one-way valve having a fluid path from the torso chamber to the knee chamber;
the upper chamber being U-shaped having a first side leg, a second side leg, and a top extending from the first side leg to the second side leg, the first side leg and the second side leg fluidly connecting the top of the upper chamber and the torso chamber.

2. The airbag assembly of claim 1, further comprising an inflator in fluid communication with the upper chamber, the first side leg and the second side leg defining a fluid path from the top to the torso chamber.

3. The airbag assembly of claim 1, further comprising a head-impact chamber in fluid communication with and extending upwardly from the torso chamber between the first side leg and the second side leg in the inflated position.

4. The airbag assembly of claim 3, further comprising a space between the head-impact chamber and the first side leg, the second side leg, and the top in the inflated position.

5. The airbag assembly of claim 3, further comprising an uninflatable panel extending from the first side leg to the second side leg adjacent the head-impact chamber.

6. The airbag assembly of claim 5, wherein the head-impact chamber in the inflated position is movable toward the uninflatable panel in a vehicle-forward direction.

7. The airbag assembly of claim 1, further comprising an external tether extending from the torso chamber to the knee chamber.

8. The airbag assembly of claim 1, wherein the knee chamber is vehicle-forward of the torso chamber in the inflated position.

9. The airbag assembly of claim 1, further comprising a support chamber inflatable to an inflated position, the support chamber extending from the torso chamber, and the knee chamber extending from the support chamber.

10. The airbag assembly of claim 9, wherein the fluid path of the one-way valve extends through the support chamber to the knee chamber.

11. An airbag, comprising:
a U-shaped chamber having a first side leg, a second side leg, and a top extending from the first side leg to the second side leg;
a head-impact chamber between the first side leg and the second side leg;
an uninflatable panel extending from the first leg to the second leg adjacent the head-impact chamber; and
a space between the head-impact chamber and the first side leg, the second side leg, and the top in an inflated position;
the head-impact chamber being inflatable into the space between the first side leg and the second side leg.

12. The airbag of claim 11, wherein the head-impact chamber is movable toward the uninflatable panel in a vehicle-forward direction.

13. A vehicle, comprising:
a roof rail;
an instrument panel;
an airbag supported by the roof rail and inflatable to an inflated position, the airbag including:
an upper chamber, a torso chamber, and a knee chamber in fluid communication with each other and each inflatable to an inflated position;
the torso chamber being supported by and extending below the upper chamber in the inflated position;
the knee chamber being supported by and extending below the torso chamber in the inflated position; and
a one-way valve having a fluid path from the torso chamber to the knee chamber;
the airbag including a support chamber inflatable to an inflated position, the support chamber extending below the torso chamber and extending above the knee chamber, the support chamber inflatable toward the instrument panel.

14. The vehicle of claim 13, wherein the instrument panel is disposed in a vehicle-forward direction relative to the airbag.

15. The vehicle of claim 14, further comprising a vehicle seat, wherein the airbag in the inflated position is disposed between the instrument panel and the vehicle seat.

16. The vehicle of claim 15, wherein the vehicle seat has a bottom, the bottom has an upper surface, and the knee chamber extends below the upper surface of the bottom.

17. The vehicle of claim 13, wherein the upper chamber is supported by and extends below the roof rail in the inflated position.

* * * * *